(12) United States Patent
McCune et al.

(10) Patent No.: US 9,541,007 B2
(45) Date of Patent: Jan. 10, 2017

(54) COUPLING SHAFT FOR GAS TURBINE FAN DRIVE GEAR SYSTEM

(75) Inventors: Michael E. McCune, Colchester, CT (US); Brian P. Cigal, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 911 days.

(21) Appl. No.: 13/087,446

(22) Filed: Apr. 15, 2011

(65) Prior Publication Data

US 2012/0260623 A1 Oct. 18, 2012

(51) Int. Cl.
*F02C 7/36* (2006.01)
*F01D 5/06* (2006.01)

(52) U.S. Cl.
CPC . *F02C 7/36* (2013.01); *F01D 5/06* (2013.01); F05D 2220/36 (2013.01); F05D 2260/36 (2013.01); F05D 2260/40311 (2013.01); Y10T 29/4932 (2015.01); Y10T 403/7026 (2015.01)

(58) Field of Classification Search
CPC .......... F02C 7/36; F01D 5/06; F01D 2220/36; F01D 2260/40311; F01D 2260/36; Y10T 403/7026; Y10T 29/4932
USPC ................. 60/792, 796, 802, 805; 415/122.1
See application file for complete search history.

(56) References Cited

U.S. PATENT DOCUMENTS

| 2,696,346 | A | * | 12/1954 | Marchant et al. | ............ 417/247 |
| 2,711,631 | A | * | 6/1955 | Willgoos | ..................... 60/39.37 |
| 2,830,473 | A | | 4/1958 | Brown | |
| 2,883,885 | A | | 4/1959 | Upton | |
| 2,968,922 | A | | 1/1961 | Gilbert | |
| 3,352,178 | A | | 11/1967 | Lindgren et al. | |
| 3,459,072 | A | | 8/1969 | Shannon | |
| 3,754,484 | A | | 8/1973 | Roberts | |
| 3,915,521 | A | * | 10/1975 | Young | ........................... 384/467 |
| 4,050,544 | A | | 9/1977 | Kalyan et al. | |
| 4,438,663 | A | | 3/1984 | Eichenberger et al. | |
| 4,657,410 | A | | 4/1987 | Hibner | |
| 4,744,214 | A | | 5/1988 | Monsarrat et al. | |
| 5,058,452 | A | | 10/1991 | El-Shafei | |
| 5,433,674 | A | | 7/1995 | Sheridan et al. | |
| 6,206,800 | B1 | | 3/2001 | Kay | |
| 6,223,616 | B1 | | 5/2001 | Sheridan | |
| 7,591,754 | B2 | * | 9/2009 | Duong | ..................... F16D 3/72  464/79 |
| 7,621,843 | B2 | | 11/2009 | Madge et al. | |
| 7,662,059 | B2 | | 2/2010 | McCune | |
| 7,704,178 | B2 | | 4/2010 | Sheridan et al. | |
| 7,824,305 | B2 | | 11/2010 | Duong et al. | |
| 7,883,438 | B2 | | 2/2011 | McCune | |

(Continued)

FOREIGN PATENT DOCUMENTS

GB 802264 10/1958

OTHER PUBLICATIONS

Extended European Search Report for EP Application No. 12162211.2 dated Nov. 4, 2015.

*Primary Examiner* — Carlos A Rivera
(74) *Attorney, Agent, or Firm* — Carlson, Gaskey & Olds, P.C.

(57) ABSTRACT

A coupling shaft assembly for a gas turbine engine includes a forward coupling shaft section with a forward interface spline and a forward mid shaft interface spline and an aft coupling shaft section includes an aft mid shaft interface spline and an aft interface spline, the aft mid shaft interface spline engageable with the forward mid shaft interface spline.

17 Claims, 4 Drawing Sheets

(56) References Cited

U.S. PATENT DOCUMENTS

| | | | |
|---|---|---|---|
| 7,883,439 B2 | 2/2011 | Sheridan et al. | |
| 2007/0084183 A1* | 4/2007 | Moniz | F01D 21/04 60/204 |
| 2007/0084185 A1* | 4/2007 | Moniz | F01D 25/16 60/204 |
| 2007/0084187 A1* | 4/2007 | Moniz | F02C 3/067 60/204 |
| 2007/0084189 A1* | 4/2007 | Moniz | F02K 3/072 60/204 |
| 2007/0240399 A1* | 10/2007 | Orlando | F02C 7/36 60/39.162 |
| 2008/0006018 A1* | 1/2008 | Sheridan | F01D 25/18 60/39.1 |
| 2008/0098716 A1* | 5/2008 | Orlando | F01D 15/12 60/226.1 |
| 2009/0298640 A1* | 12/2009 | Duong | F16D 3/72 475/347 |
| 2010/0086403 A1* | 4/2010 | McCune | 415/229 |
| 2010/0150702 A1* | 6/2010 | Sheridan et al. | 415/170.1 |

* cited by examiner

COUPLING SHAFT FOR GAS TURBINE FAN DRIVE GEAR SYSTEM

BACKGROUND

The present disclosure relates to a gas turbine engine, and in particular, to a coupling shaft.

Advanced gas turbine engines may employ an epicyclic gear train connected to a turbine section of the engine, which is used to drive the turbo fan. In a typical epicyclic gear train, a sun gear receives rotational input from a turbine shaft through a compressor shaft.

Stresses due to misalignments can be reduced by the use of flexible couplings to connect the gear train to external devices such as rotating shafts or nonrotating supports. The flexible coupling may be mounted between the compressor shaft and the gear train so that the sun gear maintains an ideal orientation with respect to the mating gears irrespective of engine deflections.

SUMMARY

A coupling shaft assembly for a gas turbine engine according to an exemplary aspect of the present disclosure includes a forward coupling shaft section which includes a forward interface spline, and a forward mid shaft interface spline; and an aft coupling shaft section which includes an aft mid shaft interface spline, and an aft interface spline; the aft mid shaft interface spline engageable with the forward mid shaft interface spline.

A gas turbine engine according to an exemplary aspect of the present disclosure includes a forward coupling shaft section along the engine longitudinal axis, the forward coupling shaft section includes a forward interface spline engaged with the planetary gear system and a forward mid shaft interface spline and an aft coupling shaft section along the engine longitudinal axis, the aft coupling shaft section includes an aft interface spline engaged with the low pressure spool and an aft mid shaft interface spline and engageable with the forward mid shaft interface spline.

A method for assembling a gas turbine engine according to an exemplary aspect of the present disclosure includes mounting a forward coupling shaft section that includes a forward interface spline and a forward mid shaft interface spline to an aft coupling shaft section at an aft mid shaft interface spline, the aft coupling shaft section having an aft interface spline.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
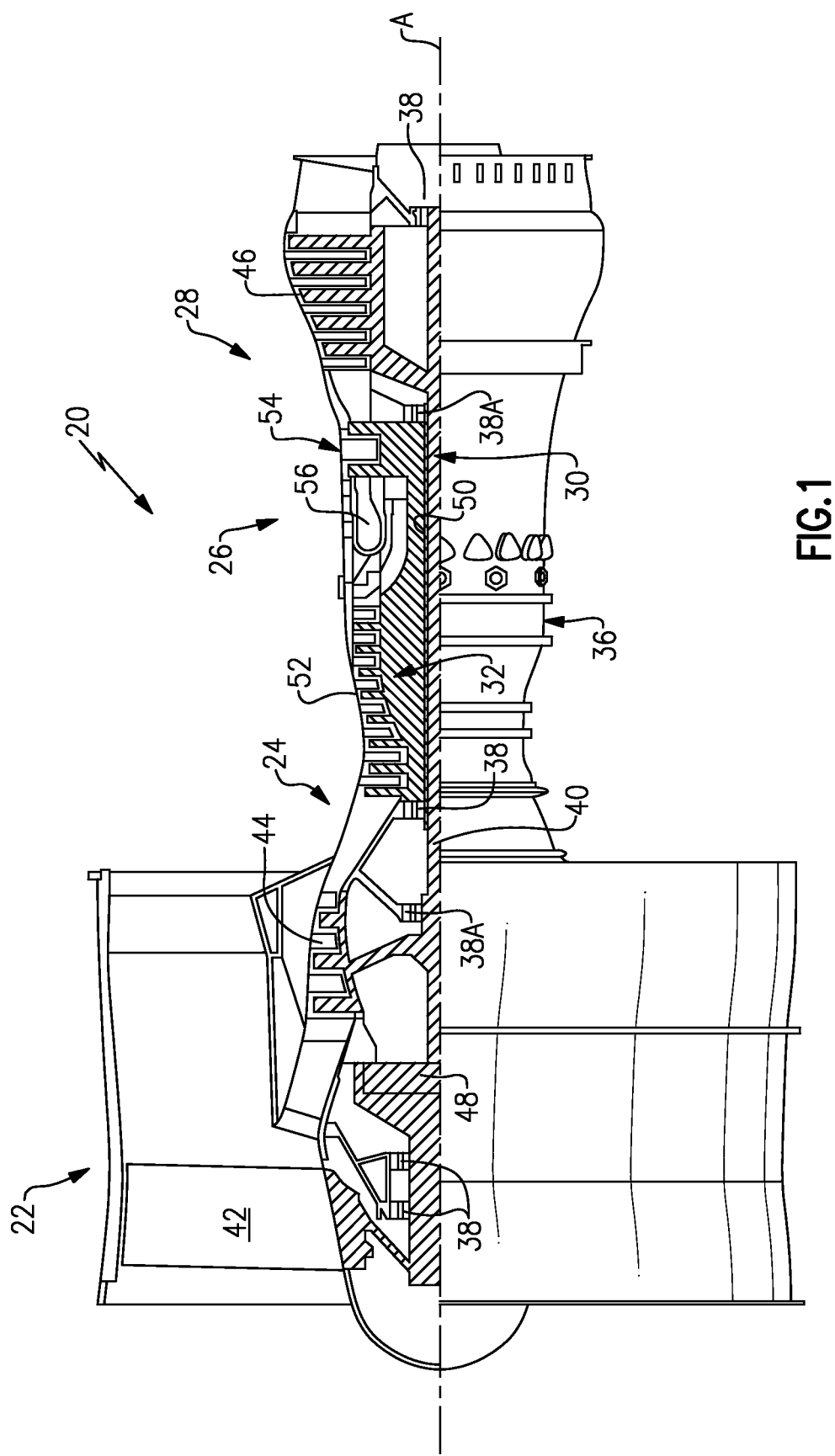
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed with fuel in the combustor 56, then expanded over the high pressure turbine 54 and low pressure turbine 46. The turbines 46, 54 rotationally drive the respective low speed spool 30 and high speed spool 32 in response to the expansion.

The main engine shafts 40, 50 are supported at a plurality of points by the bearing system 38 within the static structure 36. In one non-limiting embodiment, bearing system 38 includes a number two bearing system 38A located within the compressor section 24.

Figure 2:
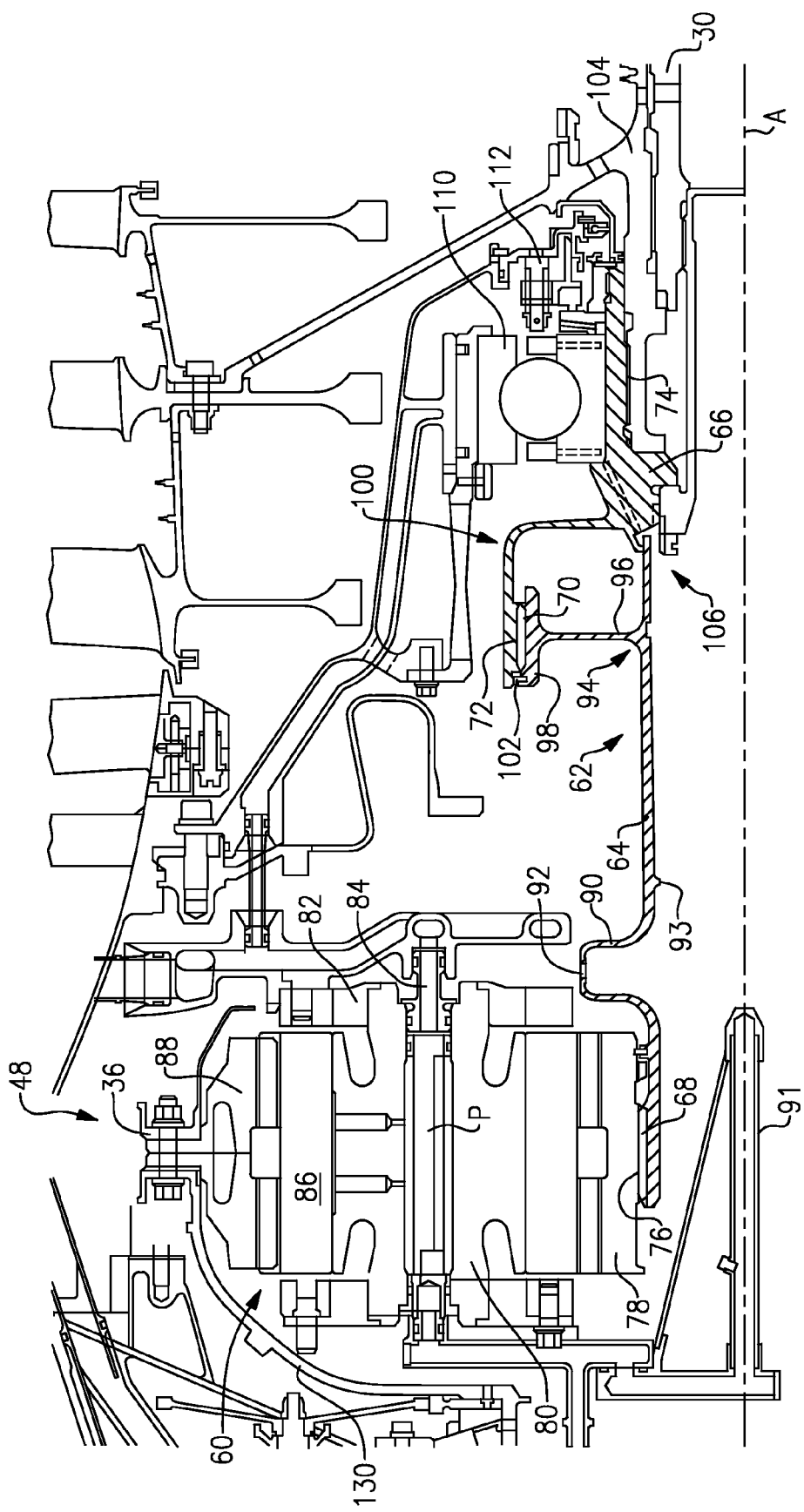
FIG. 2 is an enlarged cross-section of a sectional of the gas turbine engine which illustrates a coupling shaft assembly.

With reference to FIG. 2, the geared architecture 48 generally includes a epicyclic gear system 60 driven by the low speed spool 30 through a coupling shaft assembly 62. The coupling shaft assembly 62 facilitates a modular engine construction, a compact package, and a relatively short overall engine length. The coupling shaft assembly 62 transfers torque from the low speed spool 30 to the geared architecture 48 as well as facilitates the segregation of vibrations and other transients therebetween.

The coupling shaft assembly 62 generally includes a forward coupling shaft section 64 and an aft coupling shaft section 66. The forward coupling shaft section 64 includes an interface spline 68 and a mid shaft interface spline 70. The aft coupling shaft section 66 includes a mid shaft interface spline 72 and an interface spline 74. The relatively larger inner diameter of the coupling shaft assembly 62 facilitates receipt of fasteners and tools to secure componentry.

The interface spline 68 is joined, by a gear spline 76, to a sun gear 78 of the epicyclic gear system 60. The sun gear 78 is in meshed engagement with multiple planet gears 86, of which the illustrated planet gear 86 is representative. Each planet gear 86 is rotatably mounted in a planet carrier 82 by a journal pin 80 so that rotary motion of the sun gear 78 urges each planet gear 86 to rotate about a respective longitudinal axis P. Each planet gear 86 is also in meshed engagement with rotating ring gear 88 that is mechanically connected to the engine fan shaft 130. Since the planet gears 86 mesh with both the rotating ring gear 88 as well as the rotating sun gear 78, the planet gears 86 rotate about their own axes to drive the ring gear 88 to rotate about engine axis A. The rotation of the ring gear 88 is conveyed to the fan 42 (FIG. 1) through fan shaft 130 to thereby drive the fan 42 at a lower speed than the low speed spool 30. It should be understood that the described geared architecture 48 is but a single non-limiting embodiment and that various other geared architectures will alternatively benefit herefrom.

The forward coupling shaft section 64 may include a convolute 90 which facilities desired coupling shaft assembly 62 stiffness requirements. The convolute 90 may also include an oil aperture 92 to direct oil from an oil supply nozzle 91 toward the geared architecture 48. An oil dam 93 is located on the inner diameter of the forward coupling shaft section 64 to prevent oil from flowing forward. The forward coupling shaft section 64 can be tapered radially outward to encourage oil flow toward an aft direction due to centrifugal force on a sloped surface.

The mid shaft interface spline 70 of the forward coupling shaft section 64 is engaged with the mid shaft interface spline 72 of the aft coupling shaft section 66 to provide a slip-joint therebetween. The mid shaft interface spline 70 is located upon a vertical diaphragm 94 which further facilities desired coupling shaft assembly 62 stiffness requirements. The vertical diagram 94 is essentially a radial flange with a radial section 96 perpendicular to engine axis A and an axial section 98 parallel to engine axis A.

The mid shaft interface spline 72 of the aft coupling shaft section 66 is located within a cylindrical extension 100 of the aft coupling shaft section 66 such that the axial section 98 fits at least partially therein. The cylindrical extension 100 and the axial section 98 may include respective grooves to receive a seal 102. The interface spline 74 of the aft coupling shaft section 66 connects the coupling shaft assembly 62 to the low pressure spool 30 through, in this non limiting embodiment, splined engagement with a low pressure compressor hub 104 of the low pressure compressor 44.

Figure 3:
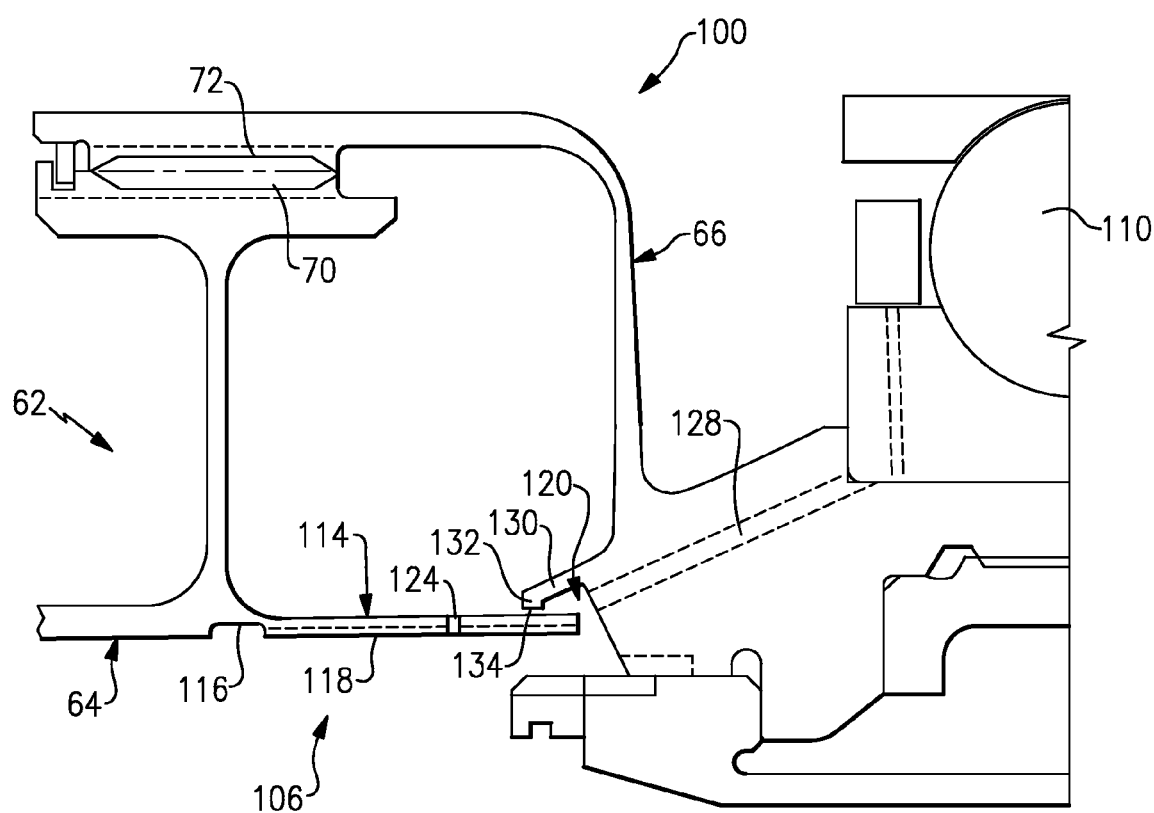
FIG. 3 is an enlarged cross-section of the coupling shaft assembly.

With reference to FIG. 3, the coupling shaft assembly 62 also includes an oil distribution feature 106 between the forward coupling shaft section 64 and the aft coupling shaft section 66. The oil distribution feature 106 guides oil from the forward mounted oil supply nozzle 91 to desired features.

Figure 4:
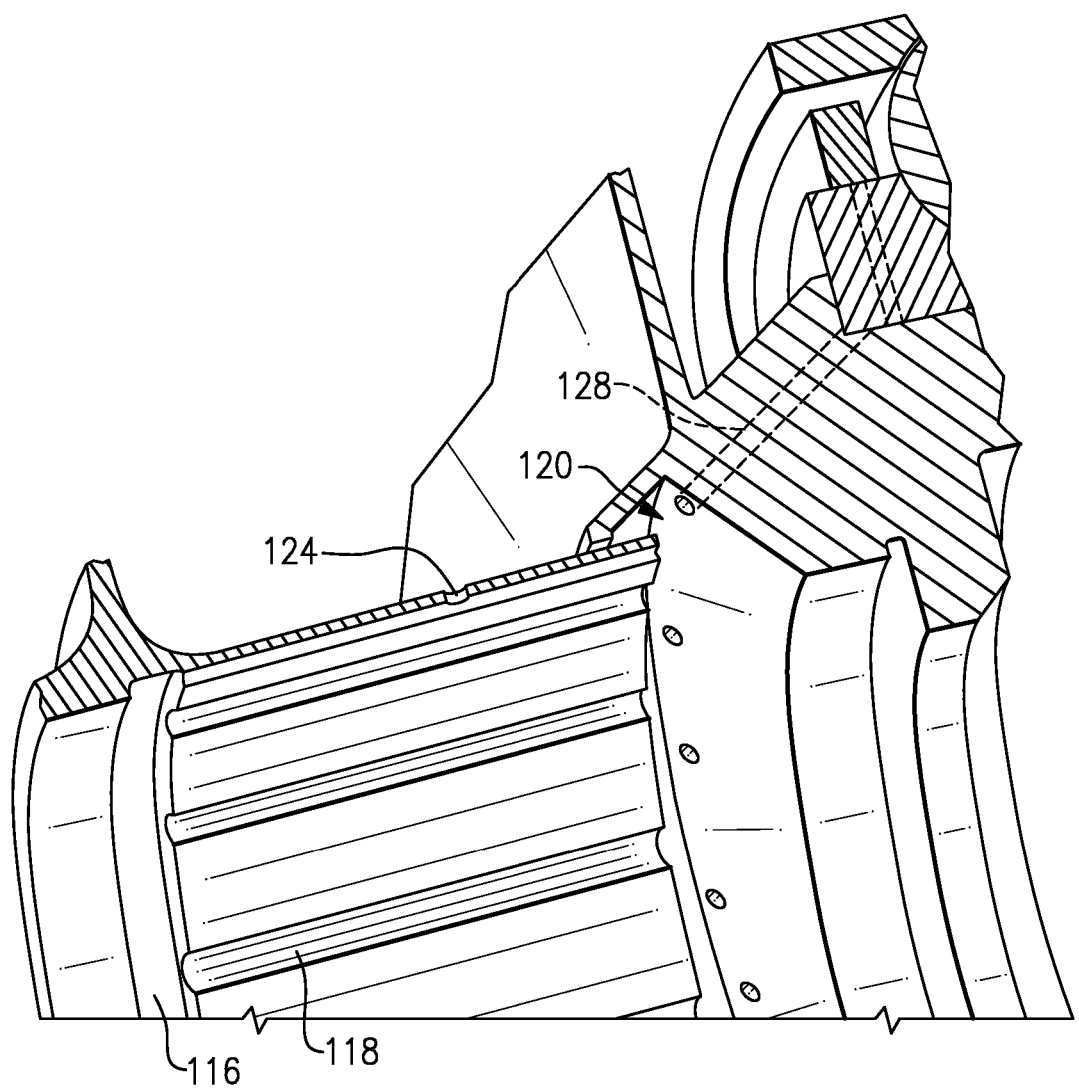
FIG. 4 is an enlarged perspective partial cross-section of the coupling shaft assembly.

An axial extending fluid bridge 114 of the oil distribution feature 106 contains an inner diameter circumferential groove 116 to provide equal distribution of oil to multiple axial slots 118 (also illustrated in FIG. 4), some of which may direct oil to the mid splines 70, 72, others of which allow passage of oil to a collection plenum 120 so as to collect then direct oil to the bearing package 110 to facilitate a relatively small diameter bearing housing which further reduces weight, part complexity and part count The circumferential groove 116 collects oil and facilitates an equalized distribution to downstream features. The multiple axial slots 118 further facilitate oil metering and distribution through, a radial hole 124 for oil delivery to the mid splines 70, 72. The collection plenum 120 may also communicate collected oil through a path 128 to deliver oil to the bearing package 110 and the carbon seal 112 (FIG. 2). A forward extending portion 130 of the collection plenum 120 facilitates the retention of oil within the collection plenum 120. An extension feature 132 of the forward extending portion 130 abuts the aft portion of the axial extending fluid bridge 114 at the separation of the forward coupling shaft section 64 and the aft coupling shaft section 66 yet forms the collection plenum 120. The extension feature 132 may alternatively or additionally include an elastomeric seal which mates to the axial extending fluid bridge 114.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A coupling shaft assembly for a gas turbine engine comprising:
   a forward coupling shaft section includes a forward interface spline and a forward mid shaft interface spline disposed upon a vertical diaphragm extending radially outward from the forward coupling shaft, and a fluid bridge extending axially aft of the vertical diaphragm; and
   an aft coupling shaft section includes an aft mid shaft interface spline and an aft interface spline, said aft mid shaft interface spline engageable with said forward mid shaft interface spline, the aft mid shaft interface spline disposed on a forward extending cylindrical extension, wherein the fluid bridge includes openings for communicating oil to the interface between the forward mid shaft interface spline and the aft mid shaft interface spline.

2. The coupling shaft assembly as recited in claim 1, wherein said vertical diaphragm includes a radial section perpendicular to an engine axis and an axial section parallel to the engine axis.

3. The coupling shaft assembly as recited in claim 2, wherein said forward mid shaft interface spline is located upon said axial section.

4. The coupling shaft assembly as recited in claim 1, wherein said forward interface spline is engageable with a sun gear of a geared architecture for the gas turbine engine.

5. The coupling shaft assembly as recited in claim 1, further comprising an oil distribution feature between said forward coupling shaft section and said aft coupling shaft section.

6. The coupling shaft assembly as recited in claim 1, wherein said fluid bridge includes a circumferential groove and a multiple of axial grooves.

7. The coupling shaft assembly as recited in claim 1, wherein said forward mid shaft interface spline fits within said aft mid shaft interface spline.

8. A gas turbine engine comprising:
an epicyclic gear system along an engine longitudinal axis;
a low pressure spool along said engine longitudinal axis;
a forward coupling shaft section along said engine longitudinal axis, said forward coupling shaft section includes a forward interface spline engaged with said epicyclic gear system and a forward mid shaft interface spline disposed on a vertical diaphragm extending radially outward from the forward coupling shaft, and a fluid bridge extending axially aft of the vertical diaphragm; and
an aft coupling shaft section along said engine longitudinal axis, said aft coupling shaft section includes an aft interface spline engaged with said low pressure spool and an aft mid shaft interface spline engageable with said forward mid shaft interface spline, the aft mid shaft interface spline disposed on a forward extending cylindrical extension, wherein the fluid bridge includes openings for communicating oil to the interface between the forward mid shaft interface and the aft mid shaft spline interface.

9. The gas turbine engine as recited in claim 8, wherein said vertical diaphragm includes a radial section perpendicular to an engine axis and an axial section parallel to the engine axis.

10. The gas turbine engine as recited in claim 9, wherein said forward mid shaft interface spline is located upon said axial section.

11. The gas turbine engine as recited in claim 8, further comprising an oil distribution feature between said forward coupling shaft section and said aft coupling shaft section.

12. The gas turbine engine as recited in claim 8, wherein said fluid bridge includes a circumferential groove and a multiple axial grooves to communicate oil toward a bearing system which at least partially supports said low pressure spool.

13. The gas turbine engine as recited in claim 8, wherein said epicyclic gear system drives a fan section at a speed different than said low speed spool.

14. A method for assembling a gas turbine engine comprising: mounting a forward coupling shaft section that includes a forward interface spline and a forward mid shaft interface spline disposed on a vertical diaphragm extending radially outward from the forward coupling shaft to an aft coupling shaft section at an aft mid shaft interface spline, the aft coupling shaft section having an aft interface spline disposed on a forward extending cylindrical extension such that a fluid bridge extending axially aft of the vertical diaphragm and including openings communicates oil to the interface between the forward mid shaft interface spline and the aft mid shaft interface spline.

15. The method as recited in claim 14, further comprising: mounting the forward coupling shaft section at least partially within the aft coupling shaft section such that the fluid bridge is at least partially axially overlapped by a portion of the aft coupling shaft.

16. The method as recited in claim 14, further comprising:
mounting the forward interface spline to a geared architecture.

17. The method as recited in claim 16, further comprising:
mounting the aft interface spline to a low pressure spool.

\* \* \* \* \*

UNITED STATES PATENT AND TRADEMARK OFFICE
CERTIFICATE OF CORRECTION

PATENT NO. : 9,541,007 B2  
APPLICATION NO. : 13/087446  
DATED : January 10, 2017  
INVENTOR(S) : Michael E. McCune and Brian P. Cigal Page 1 of 1

It is certified that error appears in the above-identified patent and that said Letters Patent is hereby corrected as shown below:

In the Claims

In Claim 1, Column 4, Line 36; after "coupling" replace "shaft" with --section--

In Claim 1, Column 4, Line 45; before "interface" replace "the" with --an--

In Claim 8, Column 5, Line 10; after "coupling" replace "shaft" with --section--

In Claim 8, Column 5, Line 20; before "interface" replace "the" with --an--

In Claim 14, Column 6, Line 13; after "coupling" replace "shaft" with --section--

In Claim 14, Column 6, Line 18; after "communicates oil to" replace "the" with --an--

In Claim 15, Column 6, Line 25; before "aft" replace "the" with --an--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*